(12) United States Patent
Tsukamoto et al.

(10) Patent No.: US 7,102,969 B2
(45) Date of Patent: Sep. 5, 2006

(54) MULTI-LEVEL OPTICAL RECORDING MEDIUM REPRODUCING METHOD AND REPRODUCING DEVICE

(75) Inventors: Syuji Tsukamoto, Tokyo (JP); Hiroyuki Arioka, Tokyo (JP); Narutoshi Fukuzawa, Tokyo (JP); Takashi Horai, Tokyo (JP); Hiroshi Take, Tokyo (JP); Motohiro Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 406 days.

(21) Appl. No.: 10/488,109

(22) PCT Filed: Sep. 11, 2002

(86) PCT No.: PCT/JP02/09303

§ 371 (c)(1),
(2), (4) Date: Mar. 10, 2004

(87) PCT Pub. No.: WO03/025917

PCT Pub. Date: Mar. 27, 2003

(65) Prior Publication Data

US 2004/0240340 A1 Dec. 2, 2004

(30) Foreign Application Priority Data

Sep. 12, 2001 (JP) .............................. 2001-275911

(51) Int. Cl.
*G11B 5/09* (2006.01)
*G11B 7/00* (2006.01)

(52) U.S. Cl. .................. 369/47.5; 369/116; 369/59.11; 369/47.36

(58) Field of Classification Search .................... None
See application file for complete search history.

(56) References Cited

U.S. PATENT DOCUMENTS

| 5,386,408 A | 1/1995 | Akahori |
| 5,886,973 A | 3/1999 | Iida |
| 6,101,153 A * | 8/2000 | Shimazaki et al. ........ 369/13.1 |
| 6,246,640 B1 * | 6/2001 | Shimazaki et al. ........ 369/13.1 |
| 2001/0036143 A1 | 11/2001 | Ohno et al. |
| 2002/0015371 A1 | 2/2002 | Arioka |

(Continued)

FOREIGN PATENT DOCUMENTS

EP 1235210 8/2002

(Continued)

OTHER PUBLICATIONS

English Language Abstract of JP 2001-084591.

(Continued)

*Primary Examiner*—Muhammad Edun
(74) *Attorney, Agent, or Firm*—Greenblum & Bernstein, P.L.C.

(57) ABSTRACT

A reproduction method for a multi-level optical recording medium according to the present invention rotates an optical recording medium, on which recording data has been recorded according to a multi-level recording method which sets several levels for light reflectivity of virtual recording cells, emits a reproduction laser beam towards the optical recording medium, and reproduces the recording data based on an electric signal generated in accordance with a received level of reflected light, the method setting the emission power of the reproduction laser beam in a range of 1.0 mW to 2.5 mW inclusive when the optical recording medium is rotated at a linear velocity in a range of 9 m/s to 25 m/s inclusive. By doing so, it is possible to improve the read accuracy for recording data while suppressing the reproduction deterioration of the optical recording medium to a level where deterioration effectively does not occur.

2 Claims, 4 Drawing Sheets

U.S. PATENT DOCUMENTS

| | | |
|---|---|---|
| 2002/0034604 A1 | 3/2002 | Arioka et al. |
| 2002/0041555 A1 | 4/2002 | Tsukamoto |
| 2002/0041556 A1 | 4/2002 | Tsukamoto |
| 2002/0044512 A1 | 4/2002 | Tsukamoto |
| 2002/0186648 A1 | 12/2002 | Ohno et al. |

FOREIGN PATENT DOCUMENTS

| | | |
|---|---|---|
| JP | 6-28711 | 2/1994 |
| JP | 9-320094 | 12/1997 |
| JP | 2001-084591 | 3/2001 |
| JP | 2001-184647 | 7/2001 |
| JP | 2001-184648 | 7/2001 |
| JP | 2001-184649 | 7/2001 |
| JP | 2002-025114 | 1/2002 |
| JP | 2002-083424 | 3/2002 |
| JP | 2002-083425 | 3/2002 |
| JP | 2002-083426 | 3/2002 |
| JP | 2002-083427 | 3/2002 |
| JP | 2002-083428 | 3/2002 |
| JP | 2002-083445 | 3/2002 |
| JP | 2002-083446 | 3/2002 |
| JP | 2002-117539 | 4/2002 |
| JP | 2002-117540 | 4/2002 |
| JP | 2002-117545 | 4/2002 |

OTHER PUBLICATIONS

English Language Abstract of JP 2001-184647.
English Language Abstract of JP 2001-184648.
English Language Abstract of JP 2001-184649.
English Language Abstract of JP 2002-025114.
English Language Abstract of JP 2002-083424.
English Language Abstract of JP 2002-083425.
English Language Abstract of JP 2002-083426.
English Language Abstract of JP 2002-083427.
English Language Abstract of JP 2002-083428.
English Language Abstract of JP 2002-083445.
English Language Abstract of JP 2002-083446.
English Language Abstract of JP 2002-117539.
English Language Abstract of JP 2002-117540.
English Language Abstract of JP 2002-117545.

* cited by examiner

| EMISSION POWER (mW) | LINEAR VELOCITY (m/sec) | DURING FIRST READ | | AFTER ONE MILLION REPRODUCTIONS | | READ ACCURACY DURING FIRST READ | READ ACCURACY AFTER CONTINUOUS REPRODUCTION |
|---|---|---|---|---|---|---|---|
| | | SER [%] | SNR [db] | SER [%] | SNR [db] | | |
| 0.9 | 9 | 4.2 | 28.5 | 4.2 | 28.3 | × | × |
| 1.0 | 9 | 4.0 | 28.8 | 4.0 | 28.7 | ○ | ○ |
| 1.1 | 9 | 3.8 | 29.1 | 3.9 | 29.0 | ◎ | ◎ |
| 2.4 | 9 | 3.7 | 29.2 | 3.8 | 29.3 | ◎ | ◎ |
| 2.5 | 9 | 3.5 | 29.6 | 4.1 | 28.8 | ◎ | △ |
| 2.6 | 9 | 3.2 | 30.0 | 4.5 | 28.3 | ◎ | × |
| 0.9 | 25 | 4.7 | 28.2 | 4.8 | 28.2 | × | × |
| 1.0 | 25 | 4.2 | 28.6 | 4.3 | 28.6 | △ | △ |
| 1.1 | 25 | 4.0 | 28.7 | 3.8 | 29.0 | ○ | ◎ |
| 2.4 | 25 | 3.9 | 29.1 | 3.9 | 29.0 | ◎ | ◎ |
| 2.5 | 25 | 3.6 | 29.3 | 3.9 | 28.8 | ◎ | ○ |
| 2.6 | 25 | 3.3 | 29.6 | 4.1 | 28.6 | ◎ | △ |

MULTI-LEVEL OPTICAL RECORDING MEDIUM REPRODUCING METHOD AND REPRODUCING DEVICE

TECHNICAL FIELD

The present invention relates to a reproduction method for a multi-level optical recording medium on which recording data has been recorded according to a multi-level recording method and a reproduction apparatus for reproducing recording data according to the reproduction method.

BACKGROUND ART

At present, as optical recording media, binary optical recording media constructed so that binary data can be recorded by forming pits by irradiation with a recording laser beam and the binary data can be reproduced based on the presence/absence of such pits are in widespread use. Due to demands in recent years for improvements to the recording density of optical recording media, research has been conducted into a recording method that adjusts the focused beam diameter of a recording laser beam to record recording data at a high density.

On the other hand, aside from methods that adjust the focused beam diameter, the development of multi-level optical recording media where one out of a plurality of marks with different meanings can be recorded in each virtual recording cell is also progressing. With such multi-level optical recording media, a characteristic is used whereby, for example, an altered part (hereinafter also referred to as a "recording mark") where the light transmissivity is lowered appears in one part of a virtual recording cell that is being recorded upon on the optical recording medium due to an irradiated amount of the recording laser beam being switched between several levels, and the proportion of an entire virtual recording cell taken up by a recording mark varies according to the irradiated amount of the recording laser beam. That is, when a reproduction laser beam is irradiated onto this multi-level optical recording medium, an effect is caused by the light transmissivity in virtual recording cells in which the above-described recording marks have been formed, resulting in there being several levels (for example, five levels) of light reflectivity for the reproduction laser beam. Accordingly, by associating the respective light reflectivity levels with respective data contents, it is possible to record one out of a plurality of data in one virtual recording cell. Here, the expression "light transmissivity" refers to the proportion of the reproduction laser beam irradiated onto a virtual recording cell that passes through the virtual recording cell, and the expression "light reflectivity" refers to the proportion of the reproduction laser beam irradiated onto a virtual recording cell that passes through the virtual recording cell, is reflected off a reflective layer of the multi-level optical recording medium, and then passes back through the virtual recording cell and exits to the periphery of the multi-level optical recording medium.

When reproducing recording data recorded on this multi-level optical recording medium (hereinafter this is also referred to as "multi-level reproduction"), the recording data is reproduced by specifying the light reflectivity of a virtual recording cell irradiated with the reproduction laser beam as a first, second, third, etc., level out of a plurality of light reflectivity levels. Here, in order to record recording data (recording marks M) at an even higher density than a normal binary optical recording medium, the size of the virtual recording marks S on a multi-level optical recording medium is set so as to be smaller than the pits on a binary optical recording medium. Also, the reading speed (i.e., read number of recording marks) per unit reproduction time should be set higher for a multi-level optical recording medium than a normal binary optical recording medium and the standard rotational speed (that is, a linear velocity when recording and reproduction are carried out at 1× speed) is set higher than the standard rotational speed of a normal binary optical recording medium. This means that during multi-level reproduction, in the case where the irradiation power of a reproduction laser beam is set at a similar level as the irradiation power (in this case, 0.7 mW or below) of the reproduction laser beam set for a normal binary optical recording medium, the ratio ("C/N", also referred to below as "SNR") of a noise component included in the reflected light increases, which can lead to a decrease in the read accuracy for recording data and to the occurrence of tracking errors when the medium is rotated at high speed. Accordingly, the present inventors tried to solve the above problems by increasing the irradiation power of the reproduction laser beam during multi-level reproduction.

DISCLOSURE OF THE INVENTION

The present inventors discovered the following improvement for a reproduction method for a multi-level optical recording medium. That is, in this reproduction method, the emission power of the reproduction laser beam should be set at a value that exceeds the emission power of a reproduction laser beam used when reproducing a binary optical recording medium to prevent decreases in the read accuracy and the occurrence of tracking errors and the like. However, when a reproduction laser beam with a high output is repeatedly irradiated onto a multi-level optical recording medium, the recording layer of the multi-level optical recording medium is altered by the irradiation of the reproduction laser beam and the signal level falls, resulting in a reduction in the SNR (hereinafter this phenomenon is called "reproduction deterioration") and in the risk that the recording data will not be reproduced correctly. When the emission power of the reproduction laser beam is set low, reproduction deterioration is avoided, but there can be a fall in read accuracy as described above. However, for multi-level optical recording media, a range of emission power for a reproduction laser beam that can improve read accuracy while also suppressing reproduction deterioration to a level where deterioration effectively does not occur has not yet been ascertained, with it being preferable to improve this situation.

The present invention was conceived in view of the above situation, and it is a principal object of the present invention to provide a reproduction method and reproduction apparatus for a multi-level optical recording medium that can improve read accuracy for recording data while also suppressing reproduction deterioration of the multi-level optical recording medium to a level where deterioration effectively does not occur.

A reproduction method for a multi-level optical recording medium according to the present invention is a method of reproducing a multi-level optical recording medium on which recording data has been recorded according to a multi-level recording method in which several levels are defined for light reflectivity of recorded parts, the reproduction method rotating the multi-level optical recording medium, emitting a reproduction laser beam towards the multi-level optical recording medium, and reproducing the recording data based on an electric signal generated in accordance with a received level of reflected light, wherein an emission power of the reproduction laser beam is set in a range of 1.0 mW to 2.5 mW inclusive when the multi-level optical recording medium is rotated at a linear velocity in a range of 9 m/s to 25 m/s inclusive.

A reproduction apparatus according to the present invention reproduces the recording data in accordance with the above-described reproduction method for a multi-level optical recording medium and includes: a laser emitting unit that emits the reproduction laser beam; a laser receiving unit that receives the reflected light emitted from the laser emitting unit and reflected by the multi-level optical recording medium and also outputs the electric signal in accordance with the received level of the reflected light; and a control unit that controls the emission power of the reproduction laser beam emitted from the laser emitting unit, wherein the control unit controls the laser emitting unit so that the emission power of the reproduction laser beam is in the range of 1.0 mW to 2.5 mW inclusive when the multi-level optical recording medium is rotated at a linear velocity in the range of 9 m/s to 25 m/s inclusive.

The above reproduction method and reproduction apparatus for a multi-level optical recording medium set the emission power of the reproduction laser beam in the range of 1.0 mW to 2.5 mW inclusive when the multi-level optical recording medium is rotated at a linear velocity in the range of 9 m/s to 25 m/s inclusive, so that the SER and BER can be maintained at levels that do not hinder the reading of the recording data, resulting in an improvement to the read accuracy for the recording data, and the reproduction deterioration of the multi-level optical recording medium can be suppressed to a level at which deterioration effectively does not occur, even after continuous reproduction.

It should be noted that the disclosure of the present invention relates to a content of Japanese Patent Application 2001-275911 that was filed on 12 Sep. 2001 and the entire content of which is herein incorporated by reference.

BEST MODE FOR CARRYING OUT THE INVENTION

Hereafter, a preferred embodiment of a reproduction method and reproduction apparatus for a multi-level optical recording medium according to the present invention will be described with reference to the attached drawings.

First, a construction of a multi-level optical recording medium 10 according to the present invention (also referred to as the "optical recording medium 10") will be described with reference to FIG. 1.

Figure 1:
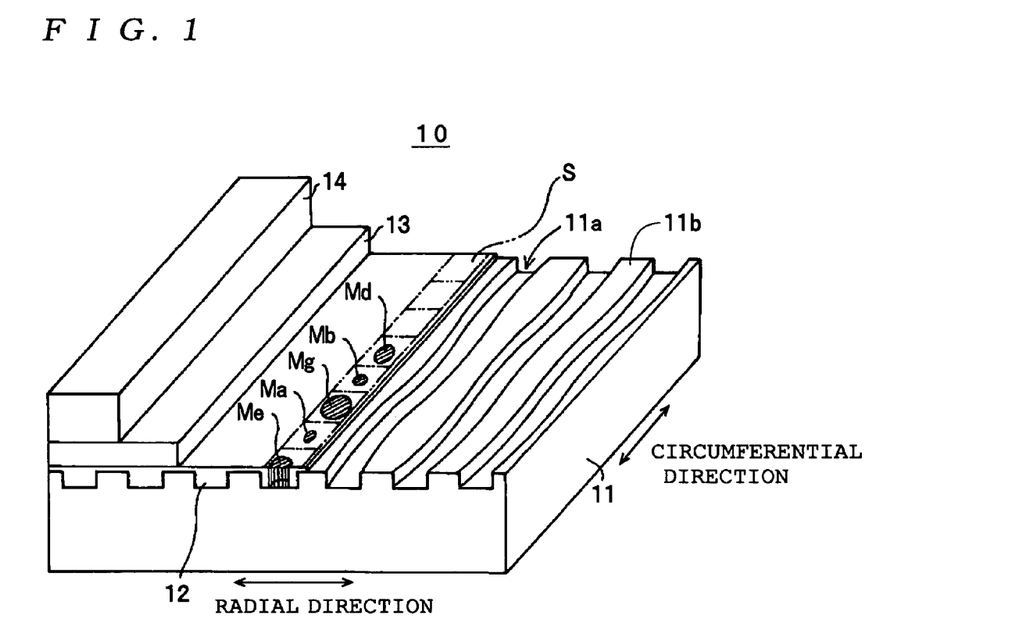
FIG. 1 is a perspective view, in which one part has been cut away to show the construction of an optical recording medium 10 according to an embodiment of the present invention.

The multi-level optical recording medium 10 is a CD-R type optical recording medium (recordable optical recording medium) and as shown in FIG. 1, includes a substrate 11, a recording layer 12, a reflective film 13, and a protective layer 14. The substrate 11 is formed of transparent resin in the shape of a disc through which a reproduction laser beam passes before the beam reaches the recording layer 12. In one surface of the substrate 11 (the upper surface in FIG. 1), grooves 11a for guiding a laser beam and lands 11b are formed in spirals from a central periphery of the substrate 11 to an outer periphery.

The recording layer 12 is formed using an organic dye, such as cyanine, merocyanine, a methine dye and derivatives of the same, a benzenethiol metal complex, a phthalocyanine dye, a naphthalocyanine dye, and azo dye, and is formed by such organic dye being applied so as to cover the grooves 11a and the lands 11b. The recording layer 12 decomposes and is altered when a recording laser beam is irradiated by a recording apparatus, with the light transmissivity of the recording layer 12 changing according to the irradiated amount of the laser beam. The reflective film 13 is a thin layer for reflecting the reproduction laser beam that has passed through the substrate 11 and the recording layer 12 during the reproduction of the recording data recorded on the optical recording medium 10, and is formed with a metal such as gold and silver as a main material by sputtering, for example, on the recording layer 12. The protective layer 14 is a layer that protects the reflective film 13 and the recording layer 12 and is formed so as to cover an outer surface of the reflective film 13.

Next, the basic principles of recording on the optical recording medium 10 will be described with reference to FIGS. 1 and 2.

On the multi-level optical recording medium 10, as shown in FIG. 1, virtual recording cells S, S, . . . are (virtually) set as recording units by virtually dividing the grooves 11a in the direction of rotation of the optical recording medium 10 (the circumferential direction). Here, as shown in FIG. 2, the length of the virtual recording cells S in the direction along the grooves 11a is set shorter (0.6 μm, for example) than the focused beam diameter (the beam waist diameter) D (1.5 μm, for example). In this case, although it is possible to freely select the width of the grooves 11a and the track pitch of the optical recording medium 10, as shown in FIG. 2, the unit width of the virtual recording cells S for the present optical recording medium 10 is set so as to be equal to or slightly narrower (0.6 μm, for example) than the width of the grooves 11a. Accordingly, the virtual recording cells S can be efficiently arranged with respect to the radial direction of the optical recording medium 10. It should be noted that the virtual recording cells S are first and foremost virtual cells and, rather than actually existing as the rectangular shapes shown in FIG. 2, are imagined by a recording/reproduction apparatus during signal processing as part of multi-level recording/reproduction.

Figure 2:
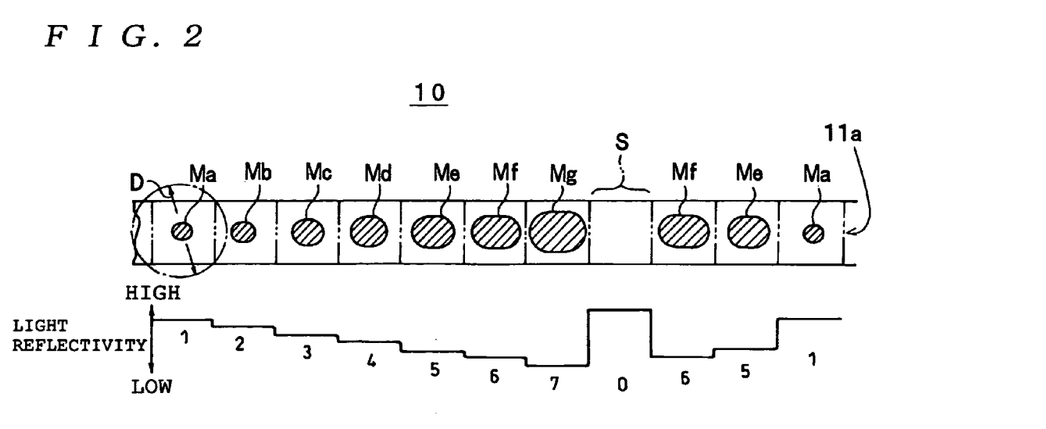
FIG. 2 is a schematic view showing recording marks Ma to Mg recorded on the optical recording medium 10.

In this case, by controlling the irradiation time of a recording laser beam emitted from the pickup of a recording apparatus (that is, the "irradiated amount" of a laser beam) at a number of levels according to a value of the recording data, as shown in FIG. 2 recording marks Ma to Mg (also referred to in general as the recording marks M when no demarcation is required) with different degrees of decomposition/alteration for (mainly the organic dye of) the recording layer 12 are formed in the virtual recording cells S. It should be noted that the degree of decomposition/alteration has been schematically illustrated by the sizes of the recording marks M. Also, the virtual recording cells S in which the recording marks M have been formed form the recording parts of the recording layer 12. When the recording of recording data is carried out by a recording laser beam, the optical recording medium 10 is rotated while being irradiated with the recording laser beam, so that the recording marks M are formed as ovals whose length depends on the irradiation time.

Also, when multi-level recording of recording data is carried out on the optical recording medium 10, the respective degrees of decomposition/alteration (i.e., the change in the light transmissivity) of the recording marks Ma to Mg are set so that light reflectivity when a reproduction laser beam is irradiated onto a part including the virtual recording cells S has seven levels (eight levels when a non-recorded part is included), for example. In this case, the smaller the degree of decomposition/alteration for the recording layer 12, the larger the light reflectivity. This means that virtual recording cells S in which a recording mark M has not been recorded characteristically have the highest light reflectivity, and parts including the virtual recording cells S in which the smallest recording marks Ma have been formed have the highest light reflectivity out of the recording marks M, with the light reflectivity decreasing in order for parts including the virtual recording cells S in which the recording marks Mb to Mf respectively have been formed and parts including a virtual recording cell S in which the largest recording mark Mg has been formed having the lowest light reflectivity.

In this case, the expression a "part including virtual recording cells S" refers to an irradiated part of the recording layer of the optical recording medium 10 where the recording or reproduction laser beam has been focused. Accordingly, this expression does not apply to a number of virtual recording cells S.

That is, depending on the focused beam diameter of the recording or reproduction laser beam, the irradiated part where the laser beam has been focused can include a certain part of a single virtual recording cell S and a part that includes one or more virtual recording cells S.

This means that by controlling the irradiated amount of the recording laser beam at the part including the virtual recording cell S and appropriately setting the area ratio of the decomposed/altered part (that is, the light reflectivity of the recording layer 12), it is possible to form the recording marks Ma to Mg that have seven levels of light reflectivity when the reproduction laser beam is irradiated.

Figure 3:
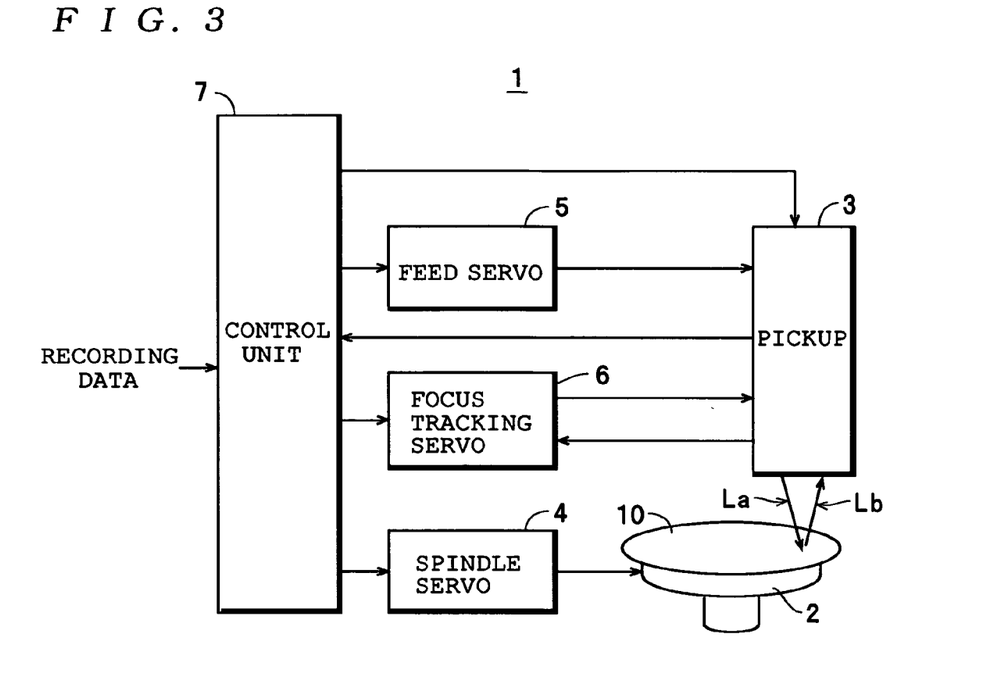
FIG. 3 is a block diagram showing the construction of a recording/reproduction apparatus 1.

Next, the recording of recording data on the optical recording medium 10 and the recording/reproduction apparatus 1 that carries out the reproduction of recording data will be described with reference to FIG. 3.

The recording/reproduction apparatus 1 corresponds to the reproduction apparatus according to the present invention, and is constructed so as to be able to reproduce recording data according to the method of reproducing a multi-level optical recording medium according to the present invention. The recording/reproduction apparatus 1 is a so-called CD-R recorder, and includes a spindle motor 2, a pickup 3, a spindle servo 4, a feed servo 5, a focus tracking servo 6, and a control unit 7. In this case, driving of the spindle motor 2 is controlled by the spindle servo 4 as described later, so that the optical recording medium 10 is rotated at a fixed linear velocity.

The pickup 3 is constructed so as to be integrated with a laser emitting section and a laser receiving section in the present invention, a laser is driven by a laser driver (neither is shown) under the control of the control unit 7 so that a recording laser beam or reproduction laser beam (emitted laser La) is emitted onto the optical recording medium 10. By doing so, the recording of the recording marks M in the virtual recording cells S and the output of an electric signal in accordance with a level of a reflected laser Lb reflected by the virtual recording cells S in which the recording marks M are recorded are carried out. In this case, during the reproduction of recording data, the laser driver of the pickup 3 adjusts, under the control of the control unit 7, the emission power of the emitted laser La in a range of 1.0 mW to 2.5 mW inclusive in accordance with the rotational speed of the optical recording medium 10. The pickup 3 is equipped with an objective lens and half mirror (neither is shown), and focuses a laser beam for recording or reproduction on the recording layer 12 of the optical recording medium 10. More specifically, the objective lens is subjected to focus tracking control by the focus tracking servo 6, resulting in the laser beam for recording or reproduction being focused on the recording layer 12 of the optical recording medium 10. The pickup 3 is moved reciprocally in a radial direction of the optical recording medium 10 by the feed servo 5 between an inner periphery and an outer periphery of the optical recording medium 10.

Under control of the control unit 7, the spindle servo 4 controls the rotation of the spindle motor 2 so that the spindle motor 2 rotates at a designated fixed speed within a range of linear velocities of 9 m/s to 25 m/s inclusive. The control unit 7 controls the driving of the pickup 3, the spindle servo 4, the feed servo 5, and the focus tracking servo 6, and based on an electric signal outputted from the pickup 3, interprets the recording data recorded on the recording layer 12.

Next, the method of reproducing recording data whereby the recording/reproduction apparatus 1 reproduces recording data recorded on the optical recording medium 10 will be described.

When the optical recording medium 10 has been loaded into the recording/reproduction apparatus 1, the control unit 7 controls the spindle servo 4 to drive the spindle motor 2 so that the optical recording medium 10 is rotated at a linear velocity of 9 m/s, for example. At the same time, the control unit 7 drives the feed servo 5 to move the pickup 3 to a lead-in area. Next, the control unit 7 causes the pickup 3 to emit the emitted laser La and also drives the focus tracking servo 6 to carry out focus tracking control of the objective lens of the pickup 3. At this time, the control unit 7 carries out driving control of the pickup 3 so that the emission power of the emitted laser La is 1.1 mW, for example. By doing so, the emitted laser La emitted by the pickup 3 is irradiated onto the lead-in area of the optical recording medium 10, and the reflected laser Lb is received by the pickup 3. At this time, the pickup 3 outputs an electric signal in accordance with various information recorded using wobble, for example, in the lead-in area, so that the control unit 7 can determine, based on the electric signal, whether the optical recording medium 10 is a multi-level optical recording medium.

After this, the control unit 7 carries out driving control of the spindle servo 4 and while keeping the rotational speed of the optical recording medium 10 at a fixed linear velocity of 9 m/s, the control unit 7 carries out driving control of the feed servo 5 so that the pickup 3 is moved to a position above an innermost groove 11a. The control unit 7 drives and controls the pickup 3 so that the emission power of the emitted laser La is maintained at 1.1 mW. By doing so, the emitted laser La emitted from the pickup 3 is irradiated onto the virtual recording cells S, S. . . . inside the grooves 11a on the optical recording medium 10, and the reflected laser Lb reflected by the reflective film 13 is received by the pickup 3. At this time, the pickup 3 outputs an electric signal in accordance with the light reflectivity of the recording marks Ma to Mg recorded in the virtual recording cells S, S, . . . , and based on this electric signal, the control unit 7 can interpret the recording data recorded on the optical recording medium 10. As a result, the recording data is reproduced.

Next, the relationship between the emission power of the emitted laser La and the read accuracy for the recording data/reproduction deterioration will be described with reference to FIGS. 4 to 7.

When each of various types of optical recording media 10 with recording layers 12 of different materials was rotated at a fixed speed, for example, at a linear velocity of 9 m/s, and the emission power of the emitted laser La was increased in stages, it was confirmed that the read accuracy of the recording data increases for the respective optical recording media 10 approximately in proportion to the emission power of the emitted laser La.

Figure 4:
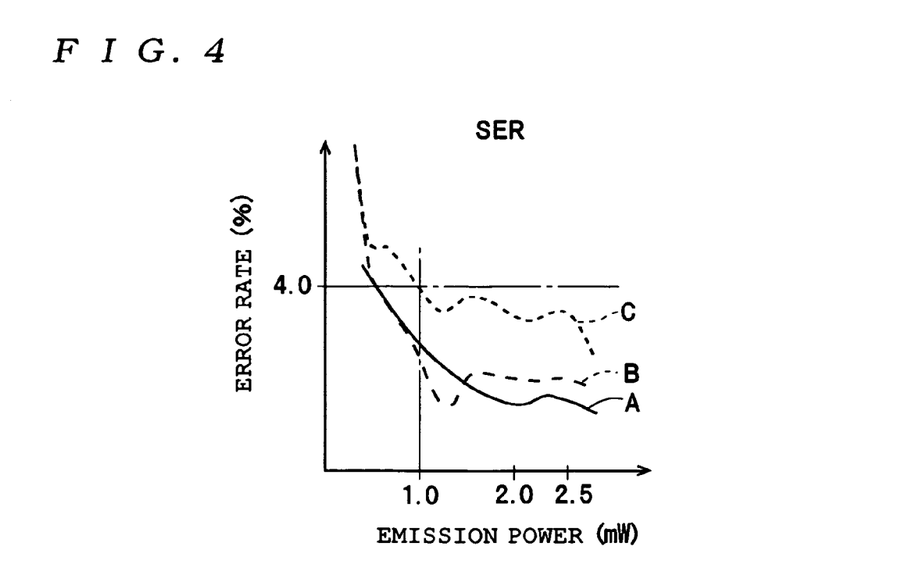
FIG. 4 is a characteristics graph showing the relationship between an emission power of an emitted laser La and an SER.
Figure 5:
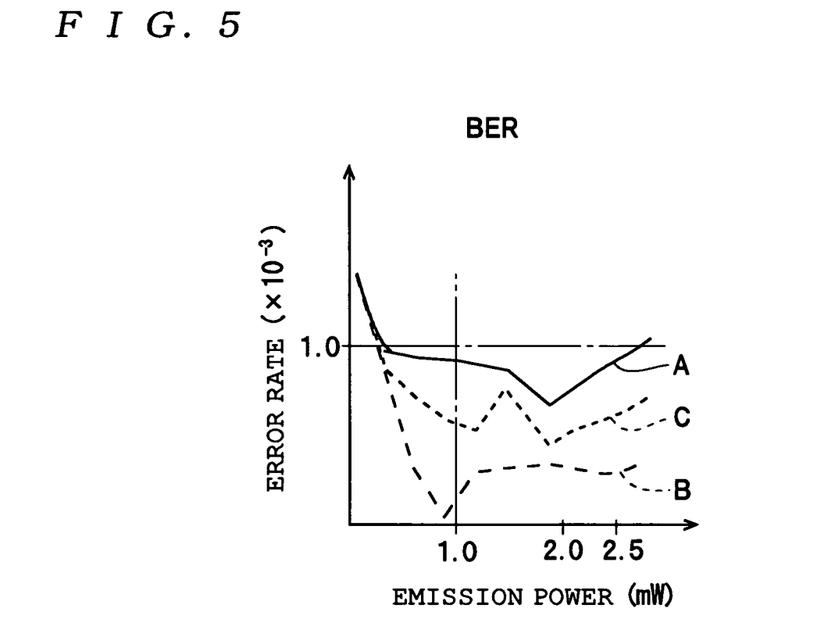
FIG. 5 is a characteristics graph showing the relationship between the emission power of the emitted laser La and a BER.
Figure 6:
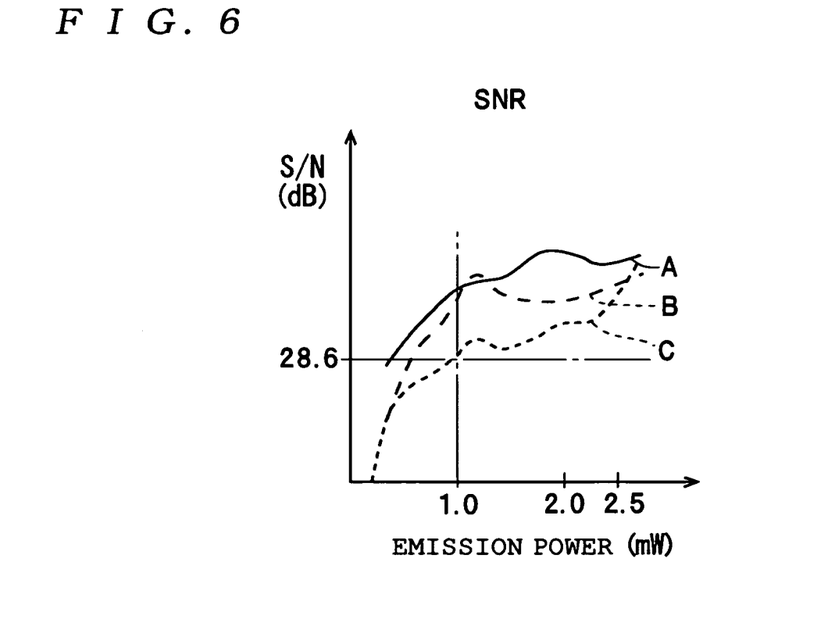
FIG. 6 is a characteristics graph showing the relationship between the emission power of the emitted laser La and an SNR.

In this case, as shown in FIG. 4, when the emission power of the emitted laser La is set at 1.0 mW or above, the SER (the ratio of read errors to correct data) can be maintained at a level (4% or below) that does not hinder the reading of the recording data. It should be noted that in FIG. 4, respective SER characteristics corresponding to the respective optical recording media 10 on which the recording layers 12 are formed of different materials are shown by solid lines or broken lines, in FIG. 5, respective BER characteristics corresponding to the respective optical recording media 10 on which the recording layers 12 are formed of different materials are shown by solid lines or broken lines, and in FIG. 6, respective SNR characteristics corresponding to the respective optical recording media 10 on which the recording layers 12 are formed of different materials are shown by solid lines or broken lines. More specifically, in FIGS. 4 to 6, the optical recording medium 10 shown by the solid line A is constructed with the recording layer 12 made of cyanine dye, the optical recording medium 10 shown by the broken line B is constructed with the recording layer 12 made of phthalocyanine dye including Zn and V as the metal center, and the optical recording medium 10 shown by the broken line C is constructed with the recording layer 12 made of phthalocyanine dye including Pd as the metal center. When, as shown in FIG. 5, the emission power of the emitted laser La is set at 1.0 mW or above, the BER (bit error rate) is kept at a level ($1 \times 10^{-3}$ or below) that does not hinder the reading of the recording data. This is because as shown in FIG. 6, when the emission power of the emitted laser La is set at 1.0 mW or above, the ratio of the noise component (the SNR) for the reflected laser Lb can be kept at a level (28.6 dB or above) that does not hinder the reading of the recording data. In this case, even if the optical recording medium 10 is rotated at a fixed linear velocity of 25 m/s, if the emission power of the emitted laser La is set at 1.0 mW or above, in the same way as when the optical recording medium 10 is rotated at a linear velocity of 9 m/s, it was confirmed that the SER and BER can be maintained at levels that do not hinder the reading of the recording data.

On the other hand, as shown in FIGS. 4 to 6, when the emission power of the emitted laser La is successively reduced from 1.0 mw, the SER and BER gradually increase and the SNR gradually decreases, so that due to the type of the material of the recording layer 12 and unevenness during manufacturing, there is increased probability of the SER, BER, and SNR moving away from the levels described above that do not hinder the reading of the recording data.

Figure 7:
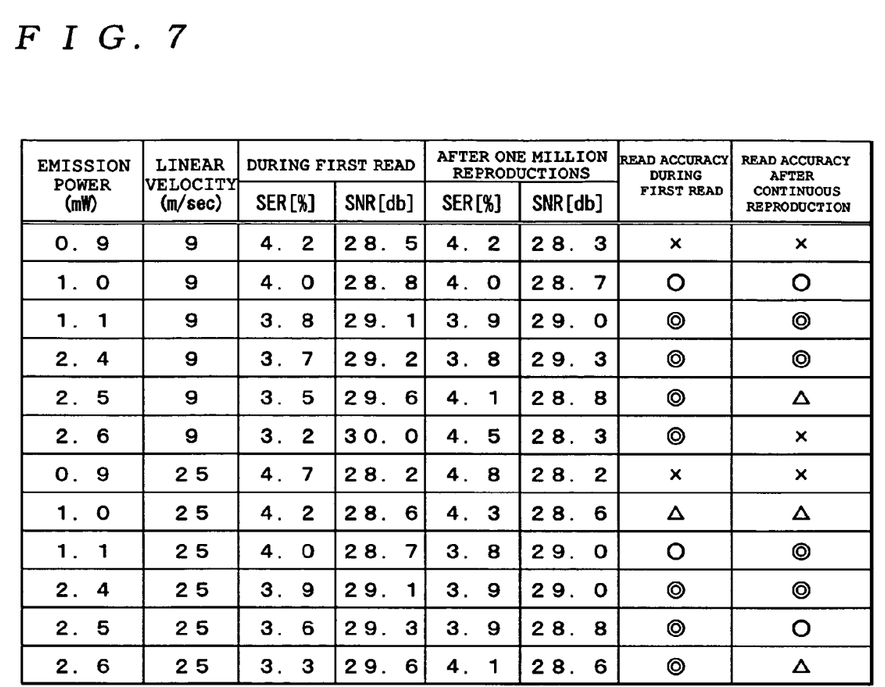
FIG. 7 is a table useful in explaining the relationship between the emission power of the emitted laser La, the rotational speed (linear velocity) of the optical recording medium 10, an SER, SNR and first read accuracy measured during a first reproduction, and a SER and SNR measured after one million consecutive reproductions, and the read accuracy measured after continuous reproductions.

In reality, as shown in FIG. 7, for an optical recording medium 10 constructed with a recording layer 12 made of phthalocyanine dye including Pd as the metal center, it was confirmed that when the emission power of the emitted laser La is set at 0.9 mW that is below 1.0 mW, the first read accuracy of the recording data and the read accuracy after continuous reproduction were both below a level at which the reading of the recording data is hindered. On the other hand, it was confirmed that when the emission power of the emitted laser La is set in a range of 1.0 mW to 2.5 mW inclusive, it was actually possible to correctly read the recording data on the optical recording medium 10. Also, as shown in FIG. 7, when the emission power of the emitted laser La is set at 2.6 mW, it was confirmed that although the first read accuracy of the recording data is at a level that does not hinder the reading, the emitted amount of the emitted laser La per unit time for the recording layer 12 becomes large, more so at a linear velocity of 9 m/s than a linear velocity of 25 m/s, which causes alteration to the recording layer 12, so that the read accuracy after continuous reading falls, which is to say, reproduction deterioration occurs.

Accordingly, it was understood that when the optical recording medium 10 is rotated at a linear velocity in a range of 9 m/s to 25 m/s inclusive, by setting the emission power of the emitted laser La in a range of 1.0 mW to 2.5 mW inclusive, it is possible to correctly reproduce the recording data while suppressing reproduction deterioration to a level where deterioration effectively does not occur.

It should be noted that the ratings in the "first reproduction accuracy" and the "read accuracy after continuous reproduction" columns shown in FIG. 7 were produced by the following evaluation method for the respective SER and SNR values measured during a first reproduction and after one million reproductions. In this evaluation method, based on the characteristic that read accuracy decreases as the value of the SER increases, zero points were given for an SER of 4.2% or above, one point was given for an SER of 4.0% or above but below 4.2%, and two points were given for an SER of below 4.0%, based on the characteristic that read accuracy decreases as the value of the SNR falls, zero points were given for an SNR of 28.5 dB or below, one point was given for an SNR of above 28.5 dB but no greater than 28.9 dB, and two points were given for an SNR of above 28.9 dB, and the read accuracy was then judged based on the overall magnitude of the total of the points for the SER and SNR. More specifically, when the points total is zero points, it is determined that there is a high risk of difficulties in reading the optical recording medium 10 correctly (indicated by the code "×").

Similarly, when the points total is one point, it is determined that there will effectively be no problems (indicated by the code "Δ"). Also, when the points total is two or three points, it is determined that the recording data can be read sufficiently (indicated by the code "○"). When the points total is four points, it is determined that the optical recording medium 10 will definitely be read correctly (indicated by the code "◎").

It should be noted that the present invention is not limited to the embodiment described above and that various modifications are possible as appropriate. For example, in the above embodiment, an example where the emission power of the emitted laser La is set at 1.1 mW when the optical recording medium 10 is rotated at a linear velocity of 9 m/s is described, but the present invention is not limited to this. For example, when the optical recording medium 10 is rotated at a linear velocity of 9 m/s or below, the range of emission power (i.e., a lower limit of 1.0 mW and a higher limit of 2.5 mW) of the reproduction laser beam can be reduced in proportion to the linear velocity, and when the optical recording medium 10 is rotated at a linear velocity of above 25 m/s, the range of emission power (from a lower limit to an upper limit) of the reproduction laser beam can be increased in proportion to the linear velocity, so that it is possible to correctly reproduce the recording data while suppressing reproduction deterioration of a multi-level optical recording medium to a level where deterioration effectively does not occur.

INDUSTRIAL APPLICABILITY

As described above, according to the method of reproducing a multi-level optical recording medium and reproduction apparatus according to the present invention, by setting the emission power of a reproduction laser beam in a range of 1.0 mW to 2.5 mW inclusive when a multi-level optical recording medium is rotated at a linear velocity in a range of 9 m/s to 25 m/s inclusive, it is possible to keep the SER and BER at levels that do not hinder the reading of the recording data. This means that it is possible to realize a reproduction method and reproduction apparatus for a multi-level optical recording medium that can increase the read accuracy for recording data and can suppress the reproduction deterioration of the multi-level optical recording medium to a level where deterioration effectively does not occur, even when continuous reproduction is carried out.

The invention claimed is:

1. A reproduction method for a multi-level optical recording medium on which recording data has been recorded according to a multi-level recording method in which several levels are defined for light reflectivity of recorded parts, the reproduction method rotating the multi-level optical recording medium, emitting a reproduction laser beam towards the multi-level optical recording medium, and reproducing the recording data based on an electric signal generated in accordance with a received level of reflected light, wherein an emission power of the reproduction laser beam is set in a range of 1.0 mW to 2.5 mW inclusive when the multi-level optical recording medium is rotated at a linear velocity in a range of 9 m/s to 25 m/s inclusive.

2. A reproduction apparatus that reproduces the recording data in accordance with the reproduction method for a multi-level optical recording medium according to claim 1, comprising:

a laser emitting unit that emits the reproduction laser beam;

a laser receiving unit that receives the reflected light emitted from the laser emitting unit and reflected by the multi-level optical recording medium and also outputs the electric signal in accordance with the received level of the reflected light; and a control unit that controls the emission power of the reproduction laser beam emitted from the laser emitting unit, wherein the control unit controls the laser emitting unit so that the emission power of the reproduction laser beam is in the range of 1.0 mW to 2.5 mW inclusive when the multi-level optical recording medium is rotated at a linear velocity in the range of 9 m/s to 25 m/s inclusive.

* * * * *